United States Patent [19]

Richard

[11] 4,413,712
[45] Nov. 8, 1983

[54] DEVICE FOR LOCKING AN ELEMENT IN A STATIONARY POSITION FOR AN AUTOMOBILE VEHICLE

[75] Inventor: Jackie Richard, Bezons, France

[73] Assignee: Regie Nationale des Usines Renault, France

[21] Appl. No.: 233,528

[22] Filed: Feb. 10, 1981

[30] Foreign Application Priority Data

Feb. 12, 1980 [FR] France .................. 80 03077

[51] Int. Cl.³ .................................. B60K 67/00
[52] U.S. Cl. ......................... 192/4 A; 74/577 S; 188/82.7
[58] Field of Search .............. 192/4 A, 4 R; 188/69, 188/31, 60, 82.7; 74/577 S

[56] References Cited

U.S. PATENT DOCUMENTS 656,379   8/1900  Seymour et al. ............... 74/577 S
2,008,140 7/1935  Matson ........................... 192/4 A
3,043,403 7/1962  Kelley ............................ 192/4 A
3,601,231 8/1971  Kolacz ........................... 192/4 A
4,223,768 9/1980  Iwanaga ......................... 192/4 A Primary Examiner—George H. Krizmanich
Attorney, Agent, or Firm—Beveridge, DeGrandi & Kline

[57] ABSTRACT

A locking finger member (7) cooperates with notches (3, 4) of a parking wheel (1). The respective contact surfaces (3a, 6a and 3b, 6b) are inclined in an asymmetric manner with respect to a radius of the parking wheel (1). It is then possible to choose these inclinations in such manner that the torques exerted on the locking finger member (7) upon its disengagement under the action of the rotation of the parking wheel (1) are substantially equal, even for a small longitudinal dimension of the locking finger member (7). Thus it is possible to construct a locking device of very small overall size.

6 Claims, 1 Drawing Figure

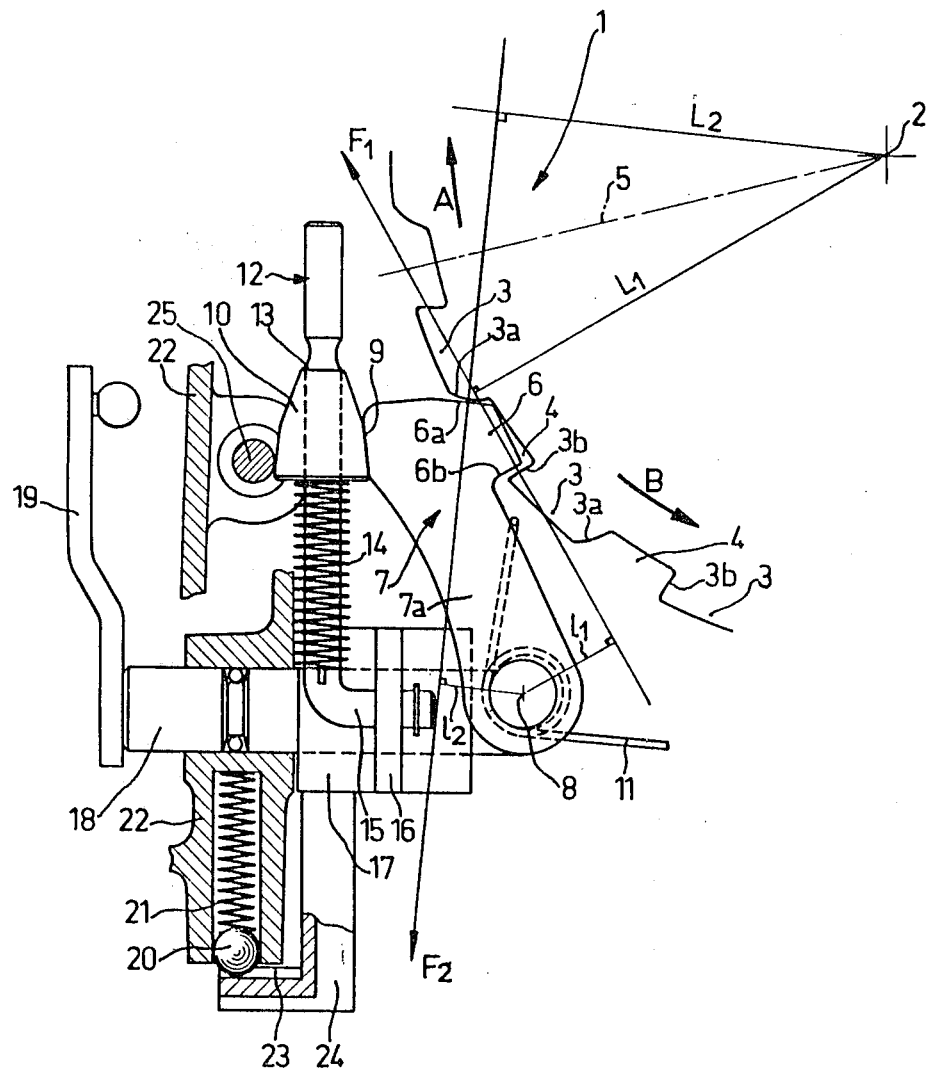

DEVICE FOR LOCKING AN ELEMENT IN A STATIONARY POSITION FOR AN AUTOMOBILE VEHICLE

DESCRIPTION

The present invention relates to a locking device for maintaining in a stationary position a rotary mechanical element which is part of a power unit and is connected to the driving wheels of an automobile vehicle.

Such a rotary mechanical element, usually formed by a wheel termed a "parking wheel" comprising a plurality of peripheral notches, is required in automobile vehicles having an automatic transmission, i.e. a transmission provided with a hydraulic converter. In vehicles of this type is is indeed necessary to lock the vehicle in position with perfect safety when the vehicle is intended to be stationary. This locking cannot be achieved as it can in a vehicle having a conventional transmission and clutch by engaging one of the speeds of the gearbox. Consequently, the vehicle is locked in the stationary position by means of this rotary mechanical element whose peripheral notches cooperate with a locking finger member which may be manually placed by the driver in a position of cooperation with the notches.

In order to unlock such a system, advantage is usually taken of the torque produced by the weight of the vehicle and exerted through the driving wheels on the rotary mechanical element constituting the parking wheel. This torque tends to turn this mechanical element in one direction or the other, depending on the slope of the surface on which the stationary vehicle is placed. Consequently, the active part of the locking finger member and the various peripheral notches of the rotary mechanical element must be so shaped that this torque exerted by the rotary mechanical element automatically produces a movement disengaging the locking finger member. It is only when the vehicle is stationary on a perfectly horizontal surface that the locking finger member must be disengaged by special means comprising, for example, a return spring.

The present invention relates to a locking device of this type in which the locking finger member is, as just mentioned, disengaged automatically and in which the structure of the peripheral notches of the rotary mechanical element and of the active part of the locking finger member is such that it is possible to achieve an extremely compact configuration of the device while maintaining an equilibrium between the locking finger member pivoting torques for each direction of rotation of the mechanical element formed by the parking wheel.

The device for locking in a stationary position according to the present invention comprises a rotary mechanical element connected to the driving wheels of an automobile vehicle. The mechanical element comprises a plurality of peripheral notches which cooperate with an automatically disengageable locking finger member.

According to the invention, the contact surfaces of the locking finger member and one of the notches, in each direction of rotation of the mechanical element, are asymmetric with respect to a radius of the rotary mechanical element.

The inclinations of the confronting contact surfaces are such that the lever arms of the forces exerted by the rotation of the mechanical element in either direction are substantially in the same ratio as the lever arms of the reactions exerted on the locking finger member with respect to the centre of rotation of the locking finger member.

Further, the inclinations of the contact surfaces must be such that the lever arms of the forces exerted by the rotation of the mechanical element are not zero. Notwithstanding this limitation, the asymmetry of the aforementioned contact surfaces permits the use of a locking finger member whose dimensions are distinctly smaller than those of the locking finger members employed heretofore in respect of which the contact surfaces were symmetric.

In order to improve the disengagement of the locking finger member when the mechanical element rotates, the respective contact surfaces of the notches and/or of the locking finger member are preferably rounded and assume somewhat the shape of an involute of a circle. In order to simplify the design of the device, a profile in the shape of an involute of a circle could be given to only some of these surfaces, for example those of the peripheral notches of the rotary mechanical element.

A better understanding of the invention will be had from the study of a particular embodiment described merely by way of example and illustrated in the accompanying drawing in which:

The single FIGURE is a diagrammatic view, partly in section, of the locking finger member of a device according to the invention which also shows the means for shifting this locking finger member and a part of the rotary mechanical element formed by a parking wheel.

As shown in the single FIGURE, the device comprises a mechanical element or parking wheel which is generally designated by the reference numeral 1 and is rotatable about its axis 2 and comprises on its periphery alternate projecting teeth 3 and notches 4 defined by contact surfaces 3a and 3b. In the illustrated embodiment, the two contact surfaces have a profile in the shape of an involute of a circle and are inclined asymmetrically with respect to a radius represented for example in the FIGURE by radius 5 in dot-dash line.

The notches of the wheel 1 cooperate with the nose 6 of a locking finger member 7 which is pivotable about a pin 8. The locking finger member 7 has a body 7a and the nose 6 is disposed at the end of this body adjacent to the wheel 1. The nose 6 is defined by inclined surfaces 6a and 6b which are adapted to come into contact with respectively the surfaces 3a and 3b defining a notch 4 of the wheel 1. It will be observed that, in the illustrated embodiment, the inclined surfaces 6a and 6b are substantially planar. Moreover, the nose 6 of the locking finger member 7 has such size that an operating clearance exists between the nose and notch when the nose enters a notch 4.

On the opposite side to the nose 6, the end of the longitudinal body 7a of the locking finger member 7 has a bearing surface 9 which is capable of coming into contact with a slidable cam 10 having a substantially frustoconical shape.

A spring 11, one of the ends of which is fixed, is wound around the pin 8 of the locking finger member 7 and bears by its other end against the face of the longitudinal body 7a which faces the wheel 1 so as to bias the locking finger member 7 to rotate it about the pin 8 in a direction for disengaging the nose 6 from a notch 4.

The means for shifting the locking finger member 7, and in particular placing the latter in the locking position shown in the FIGURE, comprise a rod 12 having a rectilinear portion on which there is slidably mounted the cam 10 so that cam 10 is capable of abutting against a shoulder 13 under the action of a spring 14. The rod 12 is completed by a bent portion 15 whose end portion extends through a radial plate 16 which is rigid with a control sector 17 which is pivotable about the axis of a shaft 18. With this arrangement, the bent end portion of the rod 12 thus rotates at the same time as the control sector 17 about the axis of the shaft 18 and displaces the rod 12 substantially in translation. The shaft 18 and control sector 17 may be locked in different suitable positions by means of a ball 20 which is biased by a compression spring 21 disposed in the case 22. The ball 20 cooperates with one or more splines 23 formed on an arm 24 rigid with the control sector 17.

The cam 10 cooperates with a reaction member 25 in the shape of a diabolo mounted on the case 22. The member 25 is located substantially on the opposite side of the cam 10 to the surface 9 of the locking finger member 7.

In the FIGURE, the device is in the position in which the vehicle is stationary and the driving wheels are locked in position by the mechanical element 1, or parking wheel, which cooperates with the locking finger member 7. In order to unlock the device, the driver shifts the lever 19 and this rotates the shaft 18 and the control sector 17. The latter is then stopped in another position by the ball 20 which cooperates with another spline of the arm 24. Under the action of the rotation of the control sector 17 and of the bent end portion 15 of the rod 12, the latter is displaced downwardly as viewed in the FIGURE. The cam 10 is also displaced downwardly by the shoulder 13 of the rod 12. The cam 10 is consequently disengaged from the surface 9 of the locking finger member 7 and from the reacting diabolo-shaped member 25. As the locking finger member 7 is no longer retained by the cam 10, it can pivot about its pin 8 and release the wheel 1.

If the vehicle is parked on a surface which has a slight slope, it subjects the driving wheels, owing to the effect of its weight, to a torque which is transmitted to the parking wheel constituting the mechanical element 1. The torque which is exerted on this element consequently tends to rotate it in one direction or the other, depending on the direction of the slope of the surface on which the vehicle is parked. If the direction of rotation of the mechanical element 1 is that shown by arrow A in the FIGURE, it is the surface 3b of the notch 4 which comes into contact with the surface 6b of the nose 6 of the locking finger member 7. The torque of the element 1 exerts on these contacting surfaces a tangential force indicated by the reference $F_1$ in the FIGURE. The orientation of this tangential force of course depends on the inclination of the contacting surfaces 3b and 6b. The torque is $C_1 = F_1 \times L_1$, in which $L_1$ is the lever arm of the tangential force $F_1$, ie. the perpendicular dropped from the centre of rotation 2 of the wheel 1 onto the direction of the tangential force $F_1$.

On the other hand, if the vehicle is placed on a surface whose slope causes the wheel 1 to rotate in the direction of arrow B in the FIGURE, the contacting surfaces are the surfaces 3a and 6a of the notch 4 and the nose 6 respectively. The tangential force which results from the torque of the wheel 1 is this time exerted in the direction of arrow $F_2$ in the FIGURE, the inclination of which again depends on that of the contacting surfaces 3a and 6a. The torque is $C_2 = F_2 \times L_2$, in which $L_2$ is the lever arm of the force $F_2$ with respect to the centre of rotation 2.

The torques $C_1$ and $C_2$ are substantially identical since, in fact, they depend only on the weight of the vehicle and the slope of the surface on which the stationary vehicle is placed which varies to only a small extent.

In practice, it is desirable to arrange that the torques pivoting the locking finger member 7 be substantially equal irrespective of the direction of rotation of the element 1. In the FIGURE, there have been shown the lever arms $l_1$ and $l_2$ for the tangential forces $F_1$ and $F_2$ which define the value of these pivoting torques. If the torques pivoting the locking finger member are to be equal, the following equation must therefore be satisfied:

$$F_1 \times l_1 = F_2 \times l_2$$

This equation can easily be satisfied by maintaining substantially in the same ratio as the lever arms $L_1$ and $L_2$ of the forces $F_1$ and $F_2$ produced by the rotation of the mechanical element 1 in one direction and the other, and the lever arms $l_1$ and $l_2$ of the corresponding reaction forces with respect to the centre of rotation 8 of the locking finger member. In other words, the following must be satisfied:

$$L_1/l_1 = L_2/l_2$$

The choice of different and asymmetric inclinations for the surfaces 3a and 3b of the notches 4 permits the orientation in given directions of the tangential forces $F_1$ and $F_2$ which have different magnitudes and also different lever arms $L_1$ and $L_2$. As the geometric position of the pin 8 of the locking finger member 7 is determined by constructional considerations concerning the structure of the case 22, the use of such asymmetric surfaces enables the dimensions of the longitudinal body 7a of the locking finger member 7 to be considerably reduced, so that a device of small overall size can be constructed.

In contrast, in a device of conventional type in which the tangential forces $F_1$ and $F_2$ are maintained equal in both directions, a locking finger member of large size must indeed be provided and the contact surfaces of the notches of the parking wheel are then symmetric with respect to a radius. A limit to the reduction in the size of the locking finger member 7 resides simply in the thickness of the nose 6 of the locking finger member 7 which must be strong enough to operate suitably. Further, the inclination of the contact surfaces must not be such that one of the lever arms, such as $L_1$ and $L_2$, becomes zero so that the corresponding tangential force passes through the centre of rotation 2. However, these are the only limits in the choice of the inclination of the contact surfaces which enables the overall size of the locking device to be considerably reduced.

Note that when the stationary vehicle is on a completely horizontal surface, no torque is exerted on the wheel 1. In this case, the locking finger member 7 is disengaged by the action of the spring 11. In all the other cases, the disengagement is achieved, as just explained, automatically by the effect of the rotation of the wheel 1, the respective contact surfaces of the peripheral notches and of the locking finger member acting in the manner of a gear. The rotation of the wheel 1 about its axis 2 consequently causes the pivoting of the locking finger member 7 about its pin 8.

In order to place the locking finger member 7 in the locking position, the driver manually shifts the lever 19 and thus puts the rod 12 back into the position shown in the FIGURE. The cam 10 acts on the bearing surface 9 in such manner as to urge the locking finger member 7 into a notch 4. In the event that such a notch is not in facing relation to the nose 6 of the locking finger member 7, the cam 10 may remain in the lower position in compressing the spring 14. In this case, a slight subsequent rotation of the wheel 1 causes the engagement of the nose 6 in the next adjacent notch 4 and the assembly is locked and the cam 10 assumes the position shown in the FIGURE under the action of the compression spring 14.

I claim:

1. A device for locking the driving wheels of an automobile in a stationary position comprising a rotary mechanical element adapted to be coupled with the driving wheels of a vehicle for locking those driving wheels when said rotary mechanical element is locked, said rotary mechanical element having a plurality of peripheral notches; and a locking device including a locking finger member and means for pivotably mounting said locking finger member for pivoting between an engaged position, in which said locking finger member engages one of the peripheral notches of said rotary mechanical element to lock said rotary mechanical element, and a disengaged position, in which said locking finger member is withdrawn from the notches of said rotary mechanical element; said locking finger member, when in the engaged position with said rotary mechanical element coupled to the driving wheels of a vehicle, being urged toward the disengaged position by rotational torque resulting from the weight of the vehicle; in the engaged position said locking finger member and one of the notches of said rotary mechanical element contacting each other on inclined contact surfaces; said contact surfaces being asymmetric with respect to a radius of said rotary mechanical element such that the inclinations of said contact surfaces result in the torque exerted by rotation of said rotary mchanical element and transmitted by said contact surfaces, to urge said locking finger member toward the disengaged position, being substantially the same for each rotational direction of said rotary mechanical element.

2. A locking device according to claim 1, wherein the inclinations of the contact surfaces are configured such that the lever arms of the forces exerted on said locking finger member by the rotation of the rotary mechanical element in either direction are substantially in the same ratio as the lever arms of the reactions with respect to the centre of rotation of the locking finger member.

3. A locking device according to claim 1 or 2, wherein the inclinations of the contact surfaces are configured such that the lever arms of the forces exerted on said locking finger member by the rotation of the rotary mechanical element are not zero.

4. A locking device according to claim 1, wherein the contact surfaces of at least one of (a) the notches and (b) the locking finger member are rounded with a profile of an involute of a circle.

5. A locking device according to claim 1, further comprising a mechanism for shifting the locking finger member; said mechanism comprising a cam and means movably mounting said cam for movement to act on the locking finger member so as to move said locking finger member toward the notches of said rotary mechanical element.

6. A locking device according to claim 5, comprising a return spring for biasing the locking finger member out of engagement with said rotary mechanical element notches in the absence of torque of the mechanical element.

* * * * *